Figure 2:
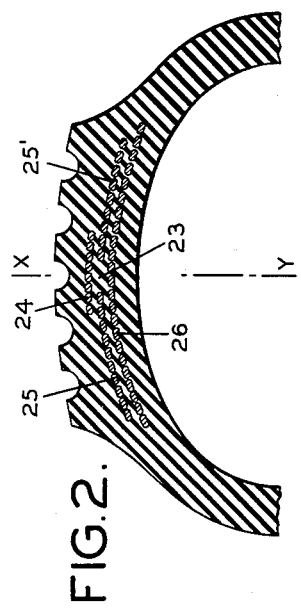

June 7, 1966  G. L. TRAVERS  3,254,693
PNEUMATIC TIRE CASINGS
Filed July 21, 1964  2 Sheets-Sheet 1

INVENTOR
GEORGES LOUIS TRAVERS
BY
HIS ATTORNEYS

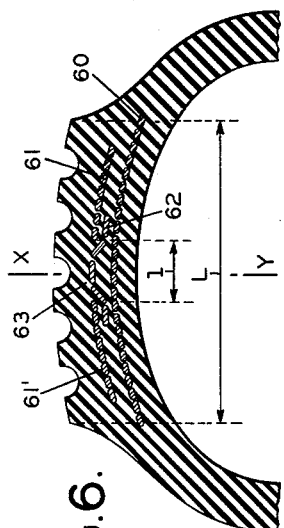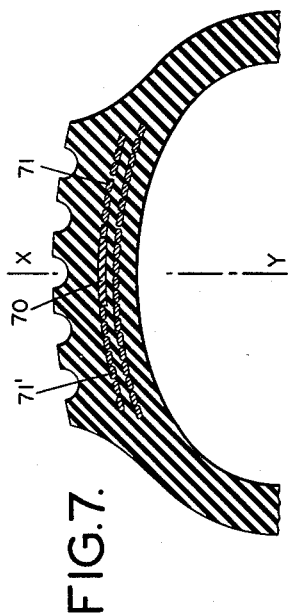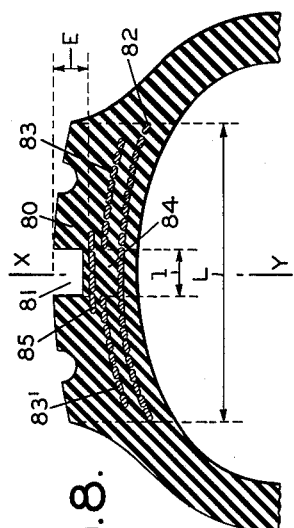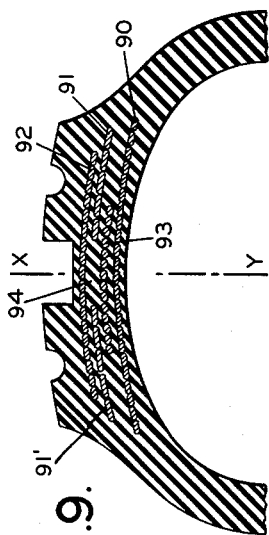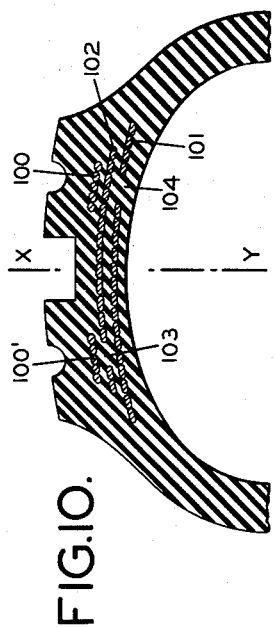

United States Patent Office 3,254,693
Patented June 7, 1966

3,254,693
PNEUMATIC TIRE CASINGS
Georges Louis Travers, Clermont-Ferrand, France, assignor to Compagnie Generale des Etablissements Michelin, raison sociale Michelin & Cie, Clermont-Ferrand, France
Filed July 21, 1964, Ser. No. 384,076
Claims priority, application France, July 23, 1963, 942,433
7 Claims. (Cl. 152—354)

This invention relates to improvements in tire casings of the tubeless and tube-containing types and relates more particularly to improvements in tire casings containing a plurality of layers or plies of reinforcing elements in the treads thereof.

Heretofore, it has been proposed to reinforce the treads of tire casings with a plurality of layers of cords or cables, at least one of which has a gap or discontinuity therein in order to improve the riding properties, roadability and resistance to wear of the tire casings. In some of these tire casings, the tread reinforcements may vary in their flexibility or rigidity in different zones of the treads in order to further modify the above-mentioned properties of the tires. The effect of the discontinuity in and variations in flexibility of the tread reinforcements is to cause the tire casing to act something in the manner of two separate tire casings so that stresses in one portion of the tread thereof do not produce unwanted reactions in another portion of the tread. By way of example, it has been found that by providing a discontinuity in a ply in the tread, it is possible to do away with uneven wear of one edge of the tire under high speed operation on curving roads or race tracks producing a corrugated or rippled surface on an edge of the tread of the tire.

The present invention is an improvement over tires of the type described above in which all of the advantages of these prior tires are retained and additional advantages are obtained.

More particularly, in accordance with the present invention, the new tire casings have a gap or discontinuity in one or more of the tread reinforcing plies and a separate narrow ply extending across the gap overlapping the adjacent portions of the discontinuous ply in order to control flexing at the zone of the gap and prevent deformation of the tread under the influence of centrifugal force.

In the new form of tire, certain relationships must be maintained between the gap in the discontinuous tread reinforcing ply and the reinforcing strip which is disposed in the gap. Thus, the gap in the discontinuous reinforcing ply should not exceed 20% of the width of the tread. The narrow ply which is disposed in or spans the gap should have a width at least equal to the width of the gap and can overlap the adjacent edges of the discontinuous ply a distance up to about 20% of the width of the tread. In practice, the strip is wider than the gap in the discontinuous ply and an overlap of some 10 mm. on either side of the gap is sufficient to obtain the desired results while an overlap of more than 20% of the width of the tread does not serve any good purpose and in fact noticeably decreases the flexibility of the tread reinforcement. The cords in the discontinuous ply, the cords in a continuous tread reinforcing ply adjacent thereto and the cords in the narrow strip ply should be inclined at different angles to the median plane of the tire so that a triangulated relation of the cords is produced at least in the zones where the narrow ply overlaps the edges of the discontinuous ply.

In addition, a groove can be provided in the middle zone of the tread having a width of about 10 to 25% of the width of the tread and a depth of about ⅔ to ⁹⁄₁₀ of the thickness of the tread as measured from the top of the outermost reinforcing ply to the surface of the tread. The presence of the groove enhances the effects of the gap in the tread reinforcing ply in providing the dual tire effect referred to above.

It has been found that the use of a discontinuous ply and a narrow overlapping ply makes the tread more resistant to flexing stresses during the rolling or rotation of the tire without decreasing the flexibility of the tire. Moreover, at higher speeds, the tire is more resistant to damage, it requires less power for driving it, is more resistant to abrasion and impact and thus wears longer and has improved roadholding ability. It appears that these advantages are due at least in part to the fact that the cords of the strip create with the plies of the tread reinforcements a triangular zone on both sides of the gap in the discontinuous ply.

In practice, the best results have been obtained by locating the discontinuous tread reinforcing ply radially outwardly of the other plies and with the gap in the longitudinal mid plane of the tire. However, improved results can be obtained when the gap is in another inner reinforcing ply and even when it is not symmetrical with the median plane of the tire and when several gaps are present in one or more plies. The angle of inclination of the cords in the tread reinforcing plies relative to the longitudinal median plane of the tire is susceptible to variation so long as a generally triangulated relation is maintained. Thus, for example, cords in the narrow reinforcing strip may be inclined at an angle between about 8° and 80° to the longitudinal median plane of the tire and they are inclined or extend in a direction opposite to that of the cords of the discontinuous reinforcement ply. While cords are referred to as being present in the narrow reinforcing ply, it can be composed of an elastomer having a higher modulus of elasticity than the elastomer of which the tread is composed. For example, a strip having a modulus of elasticity of about 350 grs. per mm.² to about 8000 grs. per mm.² at 100% elongation is suitable as a reinforcing element. Also, it has been found that best results are obtained when the reinforcing strip is disposed inwardly of the discontinuous ply but it can be positioned outwardly of or essentially in the plane of the discontinuous ply.

For a better understanding of the present invention, reference may be had to the accompanying drawing in which FIGURES 1 to 10 are cross-sectional views of portions of tire containing modified forms of reinforcements embodying the present invention.

In all of the forms of the invention illustrated, the line X—Y represents the longitudinal median plane of the tire casing.

As used herein, the term "cords" is intended to include the filaments, yarns, wires, cables, bands, and braids made of natural, artificial and synthetic textile fibers, metal, glass and the like of the types usually employed for building reinforcing plies for tires.

Figure 1:
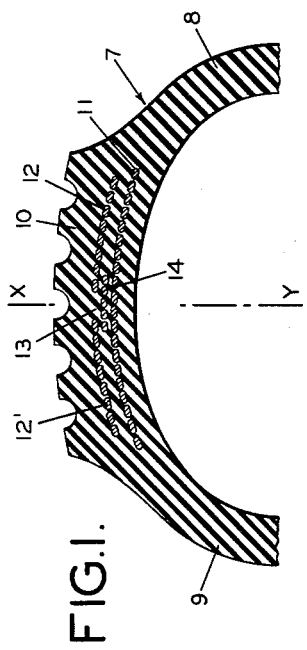

Referring now to FIGURE 1, a tire 7 is disclosed having sidewalls 8 and 9 provided at their inner edges with the usual rim engaging beads, not shown, and a tread 10. The tire casing may be provided with any of the usual carcass reinforcements, not shown, inasmuch as the type of carcass reinforcement is not of importance in descsribing the present invention. In the tire 7, the tread 10 contains a reinforcement including a continuous cord ply 11 substantially co-extensive with the tread 10 and a radially outwardly disposed discontinuous ply composed of two sections 12 and 12' separated by a gap 13 substantially in the middle of the tread and extending circumferentially of the tire casing. The gap 13 in a typical tire is approximately 15 mm. wide and is filled with the elastomer of which the tread is composed. According to the invention, the tread 10 also includes a reinforcing strip 14 which spans the gap 13 and extends circumferentially around the tire between the ply 11 and the discontinuous ply 12, 12'. A plurality of cords in side by side parallel relation make up the strip 14, these cords being inclined at an angle of about 8° to the right with respect to the plane X–Y of the tire. The cords of the section 12 of the discontinuous ply are also parallel and are inclined at an angle of about 15° to the plane X–Y and are in crossing relation to the cords of the strip 14. The cords in the section 12' of the discontinuous ply also are inclined in crossing relation to the cords of the ply 14 at an angle of about 30° to the median plane of the tire. In the continuous ply 11, the cords extend at an angle of 30° to the plane X–Y in a direction crossing the cords in the plies 12, 12' and 14, thereby producing a triangulated relation between the various plies in the zones where they overlap, which in this tire, is a zone about 10 mm. wide on each side of the median plane of the tire. With this arrangement, the right and left halves of the tire act almost like independent tires without a substantial transfer of stresses from one side to the other while nevertheless abnormal flexing in the mid zone of the tread due to road contact or expansion of the tread in the mid zone due to centrifugal force are obviated.

FIGURE 2 of the drawing shows a different embodiment of the invention in which the narrow reinforcing strip 24 is disposed radially outwardly of the gap 23 in the discontinuous ply 25, 25' and the continuous ply 26. An overlap is provided between the ply 24 and the edges of the discontinuous ply sections 25, 25' about equal to the width of the gap 23.

Figure 3:
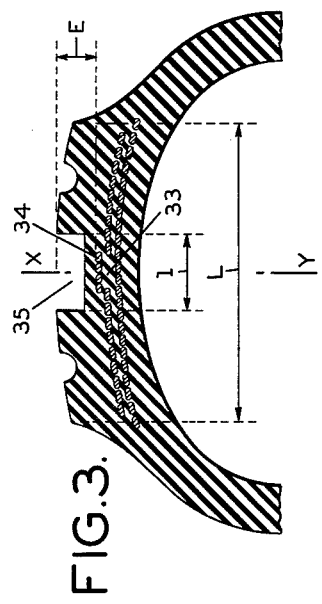

In FIGURE 3, the narrow reinforcing strip 34 is disposed radially outward of the gap 33 and a circumferential groove 35 is provided in the mid zone of the tire. This groove 35 had a width $l$ of about 25% of the width of the tread and a depth of about ⅔ of the tread thickness E measured from the tire surface of the tread to the surface of the radially outermost ply in the tread.

Figure 4:
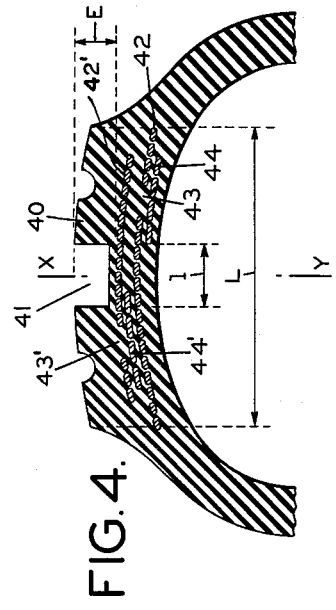

FIGURE 4 illustrates a further embodiment of the invention in which discontinuities or gaps are present in more than one of the tread reinforcing plies. In this tire casing, the tread 40 has a groove 41 therein extending circumferentially around the tire in the middle of the tread, the groove having a width about 20% of the width L of the tread and a depth approximately ⁹⁄₁₀ of the depth E of the tread. Two cord plies 42, 42' provide reinforcement for the tread, each of these plies having a gap 43, 43' about 10 mm. in width located on opposite sides of the median plane 5–Y of the tire casing. Narrow reinforcing strips 44, 44' are disposed radially inwardly of the gaps 43, 43' in the plies 42, 42', the width of the strips being about three times the widths of the gap. In this tire casing, the cords of the plies 42, 42' cross each other at an angle of about 18° to the median plane X–Y, while the cords of the strips 44 and 44' have an angle of about 60° with relation to the median plane and in crossing relation to the cords of the ply 42 located outwardly of it.

Figure 5:
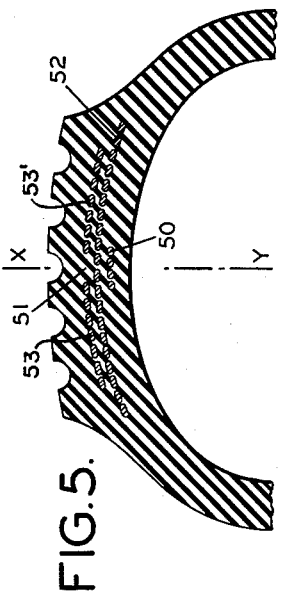

The embodiment of the invention disclosed in FIGURE 5 is similar to that shown in FIGURE 1 but in this tire casing the reinforcing strip 50 is placed inwardly of the inner continuous ply 52 but in overlapping relation to the gap 51 in the discontinuous ply 53, 53'.

A further embodiment of the invention disclosed in FIGURE 6 includes a continuous cord ply 60 spanning the tread zone and a discontinuous ply having two sections 61, 61' defining a gap 63 generally centrally and circumferentially of the tire casing. A reinforcing strip 62 is disposed partially in the gap 63 between the ply sections 61 and 61'. In the example shown, the width $l$ of the gap 63 is about 20% of the width L of the tread and the width of the reinforcing strip 62 is twice the width of the gap 63. The cords of the ply section 61 are inclined at an angle of about 15° in one direction to the plane X–Y while the cords of the ply section 61' are inclined at an angle of 15° in the opposite direction. The cords of the strip 62 are inclined at an angle of 80° to the median plane X–Y in either direction.

The embodiment of the invention disclosed in FIGURE 7 differs from those described above in that a strip of a harder, higher modulus of elastomer 70, e.g. 800 grs. per mm.² at 100% elongation is located in the gap between the discontinuous ply sections 71 and 71'. The width of the strip 70 is approximately equal to the width of the gap between the adjacent or opposed edges of the ply section 71 and 71', although some overlap is possible.

In FIGURE 8, the tread 80 of the tire casing has a circumferential groove 81 therein approximately 15% of the width L of the tread and a depth about ⁹⁄₁₀ of the tread thickness E. The tread reinforcement in the tread includes a continuous cord ply 82, a discontinuous cord ply having sections 83 and 83' separated from each other by a gap 84 approximately 15% of the width L of the tread. A reinforcing strip 85 is disposed outwardly of the gap 84 and has a width approximately equal to 1½ times the width of the gap 84. In the tire shown in FIG. 8, the cords of the ply section 83 are inclined at an angle of 18° to the left and the cords of the ply section 83' are inclined in the same direction, but at an angle of approximately 25°. In the continuous ply 82, the cords are inclined at an angle of 20° to the right, while the cords of the strip 85 are inclined at an angle of 60° to the right. The overlapping portions of the several plies, therefore, are triangulated, while the triangles formed on one side of the median plane are different than the triangles on the other side of the median plane in the overlapping zones of the plies, thereby imparting different flexibilities to these areas.

A further embodiment shown in FIGURE 9 includes a continuous ply 90, a discontinuous ply composed of ply sections 91 and 91' disposed radially outward of the ply 90 and another continuous ply 92 disposed outwardly of the discontinuous ply sections 91 and 91'. A reinforcing strip of cords 93 overlies the gap 94 between the opposed edges of the ply sections 91 and 91'. In this tire the reinforcing strip is disposed between the continuous ply 90 and the discontinuous ply sections 91 and 91'.

A further embodiment shown in FIGURE 10 includes reinforcing strips 100 and 100' disposed outwardly of discontinuous plies 101 and 102, each of which has a gap 103 and 104, respectively, disposed on opposite sides of the median plane X–Y of the tire casing.

In all of the above-described forms of the invention, the advantages of a tread reinforcement interruption are obtained with the added advantage of reduced deformation by operating stresses or centrifugal force in the zones of discontinuity thereby improving the roadability of the tire, particularly when used at high speeds on winding roads and the like.

It will be apparent that further changes may be made in the relation of the reinforcing strips to the other reinforcing plies, in the width of the gaps and the extents of overlaps of the reinforcing strip to the discontinuous plies. Accordingly, the forms of the invention described above should be considered as illustrative and not as limiting the scope of the invention as defined in the following claims.

I claim:

1. A pneumatic tire cover having a tire body having a tread thereon, comprising a reinforcing structure of cord plies substantially coextensive with and disposed in and extending substantially continuously around said tread, at least one of said plies being divided into separate circumferentially extending sections with a gap between them not exceeding about 20% of the width of the tread, and a circumferentially extending reinforcing strip spanning said gap and overlapping said sections on either side of said gap by not more than about 20% of the width of the tread.

2. A pneumatic tire cover according to claim 1, wherein said separate sections of said divided ply are of different structures.

3. A pneumatic tire cover according to claim 1, wherein each of said plies comprises parallel cords inclined to the longitudinal median plane of said tire body and said reinforcing strip comprises parallel cords inclined at an angle of from about 8° to about 80° with the longitudinal median plane of the tire body and inclined to the cords of said separate sections and those of the ply radially adjacent to them to dispose said cords in said plies and strip in triangulated relation.

4. A pneumatic tire cover according to claim 1, wherein said reinforcing strip is a band of an elastomer having a modulus of elasticicity between about 350 and 8,000 grs. per mm.² at 100% elongation.

5. A pneumatic tire cover according to claim 1, wherein said reinforcing strip is located at least partially radially outwardly of said gap.

6. A pneumatic tire cover according to claim 1, wherein said reinforcing strip is radially separated from said gap by one ply of said tread reinforcing structure.

7. A pneumatic tire cover according to claim 1, wherein the tread is provided with a circumferential groove in its mid portion, said groove having a width between about 10% and about 25% of the tread width and a depth between ⅔ and 9/10 of the tread thickness as measured from the radially outermost tread reinforcing ply.

References Cited by the Examiner
FOREIGN PATENTS

| | | |
|---|---|---|
| 26,393 | 5/1922 | France. |
| 24,030 | 1912 | Great Britain. |
| 9,464 | 12/1894 | Switzerland. |

EUGENE G. BOTZ, *Primary Examiner.*

ARTHUR L. LA POINT, *Examiner.*

C. W. HAEFELE, *Assistant Examiner.*